United States Patent [19]

Ogawa

[11] Patent Number: 6,108,671
[45] Date of Patent: Aug. 22, 2000

[54] VIRTUAL DATABASE SPACE SYSTEM AND COMPUTER-READABLE RECORDING MEDIUM RECORDED WITH DATABASE PROGRAM

[76] Inventor: Atsuro Ogawa, 5-11-6, Kanayama, Naka-ku, Nagoya-shi, Aichi 460-0022, Japan

[21] Appl. No.: 09/025,834

[22] Filed: Feb. 19, 1998

[30] Foreign Application Priority Data

Apr. 1, 1997 [JP] Japan ................................ 9-083042
Jun. 6, 1997 [JP] Japan ................................ 91-49607

[51] Int. Cl.$^7$ .................................................. G06F 17/30
[52] U.S. Cl. .................. 707/204; 707/202; 395/182.04; 395/182.13; 395/182.18
[58] Field of Search .................................. 707/202, 204; 395/182.13, 182.18, 182.04

[56] References Cited

U.S. PATENT DOCUMENTS

| | | | |
|---|---|---|---|
| 4,787,035 | 11/1988 | Bourne | 364/300 |
| 4,905,138 | 2/1990 | Bourne | 364/200 |
| 5,806,062 | 9/1998 | Chen et al. | 707/4 |
| 5,806,066 | 9/1998 | Golshani et al. | 707/100 |
| 5,857,208 | 1/1999 | Ofek et al. | 395/182.04 |
| 5,859,965 | 1/1999 | Grittins et al. | 395/182.04 |
| 5,860,121 | 1/1999 | Kapp et al. | 395/182.04 |
| 5,860,122 | 1/1999 | Owada et al. | 395/182.04 |
| 5,860,141 | 1/1999 | Washington et al. | 395/182.18 |
| 5,862,158 | 1/1999 | Johnson et al. | 395/182.04 |
| 5,862,312 | 1/1999 | Mann et al. | 395/182.13 |
| 5,862,318 | 1/1999 | Habben et al. | 395/182.18 |
| 5,862,402 | 1/1999 | Matsumoto et al. | 395/182.04 |

FOREIGN PATENT DOCUMENTS

6-83706  3/1994  Japan ........................ G06F 17/30

*Primary Examiner*—Thomas G. Black
*Assistant Examiner*—Jean M. Corrielus
*Attorney, Agent, or Firm*—Nikaido, Marmelstein, Murray & Oram LLP

[57] ABSTRACT

A virtual database space system realizable with a database program makes it possible to obtain a maximum throughput of database manipulations even when different types of transaction are mixed; can be started normally after a failure and thus eliminates the necessity for the user to be aware of the concept of recovery and as seen by the user has a very large logically nonvolatile virtual database space; and makes it possible for updates of the database to be accepted during the copying of a backup.

16 Claims, 8 Drawing Sheets

PAGE CHAIN MANAGEMENT AREA

| | |
|---|---|
| CPC | HEAD PAGE NUMBER |
| | TAIL PAGE NUMBER |
| | PAGE COUNT |
| DPC | HEAD PAGE NUMBER |
| | TAIL PAGE NUMBER |
| | PAGE COUNT |
| FPC | HEAD PAGE NUMBER |
| | TAIL PAGE NUMBER |
| | PAGE COUNT |

FIG.4
PAGE FRAME STATE TRANSITION DIAGRAM

VIRTUAL DATABASE SPACE SYSTEM AND COMPUTER-READABLE RECORDING MEDIUM RECORDED WITH DATABASE PROGRAM

BACKGROUND OF THE INVENTION

This invention relates to a computer database and particularly to a virtual database space system employing a nonvolatile virtual database space.

Computer system technology using virtual memory mechanisms has been in practical use in mainframes since the early 1970s and in personal computers since the early 1990s, about twenty years later, and since then has been accepted and developed as a core computer technology in the marketplace. Initially valued for its effect of enlarging small real memories, as real memory capacities have become larger it has since become historically valued as an effective technology for achieving maximum throughput of mixed transactions in various fields of application where this was not previously possible.

However, in databases, our historical experience with this valuable computer technology has not necessarily been used to the full.

Conventionally, processing carried out in databases such as relational databases has centered on searches. Since main memories of computers have generally been small in capacity, data of a database has been stored in a secondary storage device. Because the access speed of a secondary storage device is slower than that of a main storage device, a buffer area has been provided in the main storage device and reading and writing of data has been carried out by way of the buffer area by demand paging being conducted when necessary. When free space in the buffer area runs out, according to a method such as the LRU method the least recently used data in the buffer area is written to the secondary storage device and deleted from the buffer area.

The buffer area of a conventional database has at the most been in the range of capacity of a virtual memory device, and because virtual memory devices are volatile it has been considered completely impossible for databases to be held in them directly. Accordingly, the ultimate aim of conventional database manipulation and recovery has always been the manipulation and recovery of data in a secondary storage device such as a hard disc.

However, because it has been the manipulation of data in a secondary storage device that has been the ultimate aim, there has been a limit to increases in processing efficiency and naturally there has been a limit to the range of practical uses of the database processing of relational databases and the like. That is, although numerous trials and experiments have been conducted with the aim of using relational databases, which until recently were used mainly for searches, also as operational systems databases, in which the overwhelming majority of transactions are update transactions, there have been very few reports of satisfactory throughputs being obtained with conventional systems as they are when different transactions like these are mixed.

Also, when a failure such as a system stoppage occurs a buffer in a main storage device is lost and consequently it is necessary to carry out a recovery, and conventionally this has almost always been carried out by data in a target secondary storage device being recovered using a log constituting a history of updates. To carry out a recovery it has been necessary to separately execute a recovery program, and furthermore failures occurring during a recovery have almost always resulted in the system being down for a long time.

Also, to enable the database to be recovered when a failure occurs in the secondary storage device it has been usual for a backup copy of all the data of the database in a secondary storage device to be held in another storage device, but because when the database in the secondary storage device is updated during this backup operation the backup copy of the database may not match the database it has been necessary for updating of the database to be stopped for the duration of the backup operation.

SUMMARY OF THE INVENTION

It is therefore an object of the present invention to provide a virtual database space system with which it is possible to obtain a maximum throughput of database manipulations even when different types of transaction are mixed.

It is another object of the invention to provide a virtual database space system with which it is not necessary to require the user to be aware of the concept of recovery and which as seen by the user has a very large logically non-volatile virtual database space.

It is a further object of the invention to provide a virtual database space system with which it is possible for updates of the database to be accepted even during the operation of copying a backup.

In accordance with a first virtual database space system and a first database program of the invention, an auxiliary memory device having a larger capacity than a virtual memory space formed by a virtual memory mechanism of an operating system (OS) of a computer is provided as a virtual database space staging drive and means for transferring pages of a database between the staging drive and the virtual memory space while carrying out processing and when a page to be processed is not present in the virtual memory space reading that page from the staging drive to a page frame of the virtual memory space are provided. As a result, it is possible to provide a virtual database space of et larger capacity than the virtual memory space.

In accordance with a second virtual database space system and a second database program of the invention, page frames allocated to the virtual memory space of the OS are classified into a page frame group that is a set of page frames containing only correct pages, whose content is the same in the virtual database space as in the staging drive, that are in the virtual memory space, a page frame group that is a set of page frames containing only differed pages, whose content is different in the virtual database space from in the staging drive and which are always in the virtual memory space, and a page frame group that is a set of page frames containing only empty pages. The page frames in the page frame group containing only correct pages, the page frame group containing only differed pages and the page frame group containing only empty pages are assigned an order within the respective page frame group. When a page in the virtual database space not present in the virtual memory space is required, the content of a page record in the staging drive corresponding to a logical page number of the page in the virtual database space is transferred into a page frame at or near the head of the page frame group containing only empty pages and this page frame is made a page frame at or near the head of the page frame group containing only correct pages. When there is a shortage of empty pages a page frame at or near the tail of the page frame group containing only correct pages is made a page frame at or near the head of the page frame group containing only empty pages. When updating the content of a correct page or a differed page in the virtual memory space the page frame containing the updated page is made a page frame at or near the head of the page frame group containing only differed pages. The content of a page frame at or near the tail of the page frame group containing only differed pages is delay-written into the staging drive with a priority lower than that of other ordinary transaction processing and that page frame containing a differed page is made a page frame at or near the head of the page frame group containing only correct pages. As a result, even after the content of a differed page in the virtual memory space is written to the staging drive, because that page remains in the virtual memory space as a correct page, the number of readings from the staging drive decreases and a corresponding increase in throughput can be achieved.

In accordance with a third virtual database space system and a third database program provided by the invention, when the ratio of the number of page frames containing differed pages to the number of page frames containing correct pages in the virtual memory space exceeds a predetermined standard value, content of the page frame group containing only differed pages is delay-written to the staging drive with a priority higher than that of other ordinary transaction processing and the number of page frames containing correct pages is thereby increased.

In accordance with a fourth virtual database space system and a fourth database program provided by the invention, a serial number of a log-record of a log constituting a history of all updates of pages in the virtual database space is recorded in a log-record serial number record part. A log-record serial number obtained from the log-record serial number record part immediately before a differed page is delay-written from the page frame group containing only differed pages to the staging drive is set in the differed page and written as a DW serial number of when the differed page became a correct page along with the delayed writing. When the content of a page is to be updated the log-record serial number in the log-record serial number record part is increased and a log-record including that log-record serial number as a TW serial number and including for each of transaction groups each made up of at least one transaction a page number of one or more pages to be updated in units of these transaction groups and a data length for every data element to be an object of updating within each page and content before and after updating or these repeated is temporarily written to the log-record stack. Pages in the virtual memory space are updated using content of log-records in the log-record stack with pages being transferred from the staging drive when necessary and content of log-records in the log-record stack is recorded in a nonvolatile log storage part. As a result, normal updating and recovery after a failure can both be executed by the same procedure.

In accordance with a fifth virtual database space system and a fifth database program provided by the invention, a check point is provided at predetermined intervals and at the check point the contents of all of the differed pages in the page frame group containing only differed pages is written to the staging drive and the page frames of all of the differed pages are added to the page frame group containing only correct pages to make page frames containing correct pages. When the system starts up, without the user necessarily being aware of it, the system sequentially transfers to the log-record stack in order all log-records subsequent to the last check point and leaves in the log-record stack only log-records of pages for which a TW serial number of a log-record in the log-record stack is larger than the DW serial number of the page shown by a page number in the log-record and updates pages in the virtual memory space using the content of the log-records in the log-record stack, transferring pages from the staging drive when necessary. As a result, irrespective of whether or not the system startup follows a failure, the virtual database space as of the time of the preceding shut down is recovered just by the system being started. Thus, as seen by the user the virtual database space is nonvolatile.

In accordance with a sixth virtual database space system and a sixth database program provided by the invention, a main storage device is used in place of the virtual memory space. As a result, the invention can also be used in a computer not having a virtual memory mechanism.

In accordance with a seventh virtual database space system and a seventh database program provided by the invention, the content of the staging drive is copied to a backup drive which is a nonvolatile auxiliary memory device and while the content of the staging drive is being copied to the backup drive the delayed writing to the staging drive of content of page frames at or near the tail of the page frame group containing only differed pages is completely stopped. As a result, the content of the staging drive can be backed up to the backup drive with updates of the database being accepted in the meantime and with an increase in load being correspondingly suppressed.

In accordance with an eighth virtual database space system and an eighth database program provided by the invention, a log-record recorded before the time at which copying to the backup drive was started and all log-records subsequent to that log-record are sequentially transferred to the log-record stack in order and only pages for which a TW serial number of a log-record in the log-record stack is larger than the DW serial number of the page shown by a page number in the log-record are updated in the virtual memory space using the content of the log-record in the log-record stack. As a result, unnecessary log-records are skipped and the system is recovered normally.

DETAILED DESCRIPTION OF THE PREFERRED EMBODIMENTS

A preferred embodiment of the invention will now be described in detail with reference to the accompanying drawings.

Figure 1:
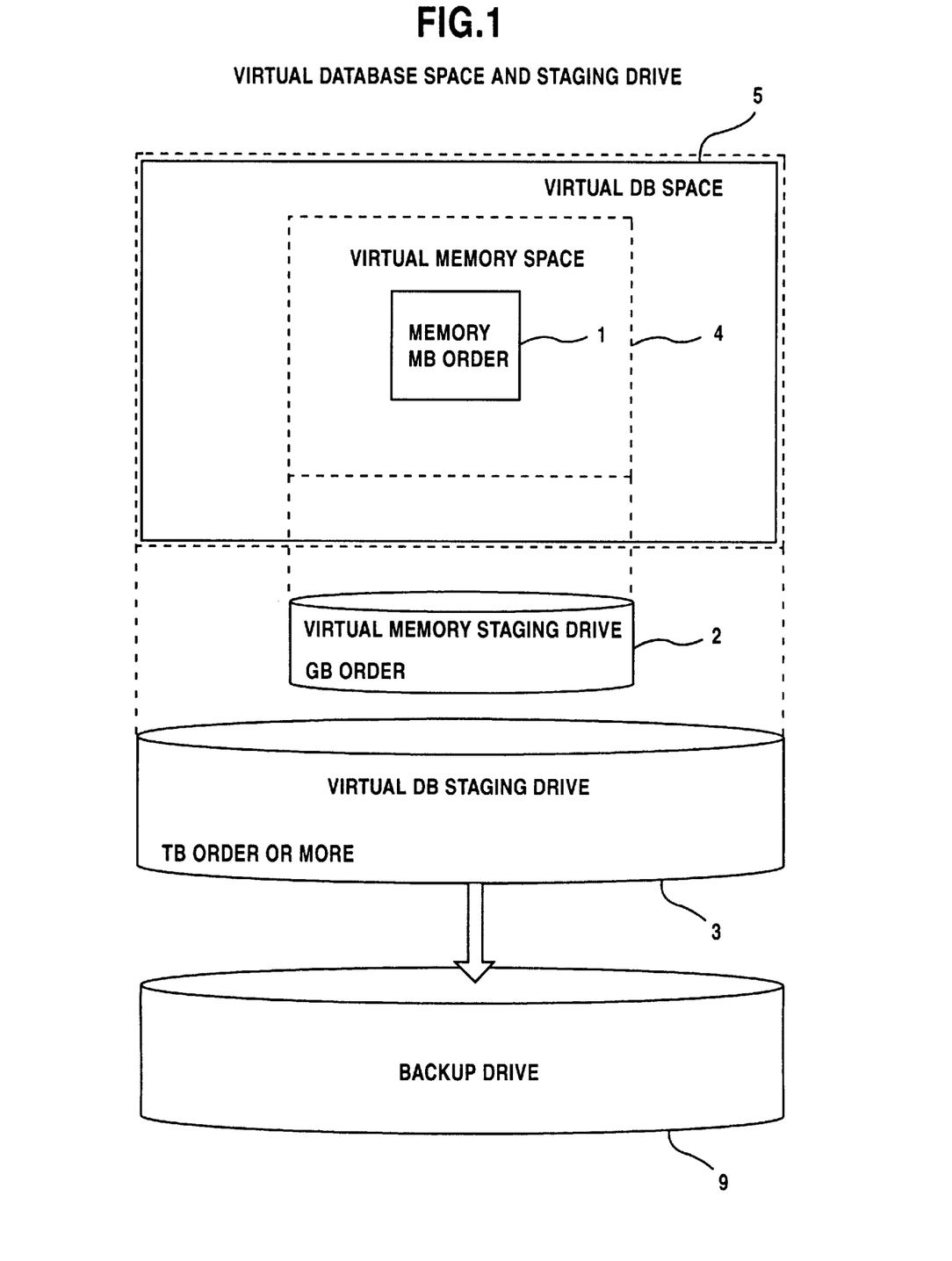
FIG. 1 is a diagram showing schematically a nonvolatile virtual database according to the invention.

FIG. 1 is a diagram showing schematically a nonvolatile virtual database space system according to the invention. Hereinafter, database will be abbreviated to DB.

In this preferred embodiment, a computer has a several MB (MegaByte) to several hundred MB memory 1 as main storage device and a for example several GB (GigaByte) to several hundred GB hard disc as a virtual memory staging drive 2 constituting a secondary storage device. An operating system (hereinafter abbreviated to OS) transfers pages constituting data structures of fixed length between the memory 1 and the virtual memory staging drive 2 by means of a virtual memory mechanism as it carries out processing. When a page to be processed is not in the memory 1, it is read into a page frame of the memory 1 from the virtual memory staging drive 2. As is generally known, by using a virtual memory mechanism it is possible to carry out processing with respect to a virtual memory space 4 of the same capacity as the virtual memory staging drive 2 in the same way as with respect to real memory. Pages in the virtual memory space 4 and pages in the memory 1 are corresponded by a segment table and multiple page tables.

This nonvolatile virtual database space system of the invention also has an auxiliary memory device of a capacity greatly larger than the virtual memory space 4 of the OS, for example a hard disc of several TB (TeraByte) to several hundred TB or more, as a virtual DB staging drive 3. Pages are transferred between the virtual memory space 4 of the OS and the virtual DB staging drive 3 as processing is carried out, and as a result it is possible for processing such as referencing and updating to be carried out with respect to a virtual DB space 5 of the same capacity as the virtual DB staging drive 3.

In case a failure occurs in the virtual DB staging drive 3, a backup copy of the entire content of the database in the virtual DB staging drive 3 is kept in a backup drive 9. As the backup drive 9, a nonvolatile and high-capacity memory such as a hard disc or magnetic tape can be used.

Each page of a logical database in the virtual DB space 5 is assigned a DB page number that a user specifies, and this DB page number and a page record number in the virtual DB staging drive 3 are corresponded one-to-one by a fixed computational expression. Page frame numbers allocated to the DB in the virtual memory space 4 and the DB page numbers of the virtual DB space 5 are corresponded by a DB page directory and DB page tables of the kind shown in FIG. 2.

Figure 2:
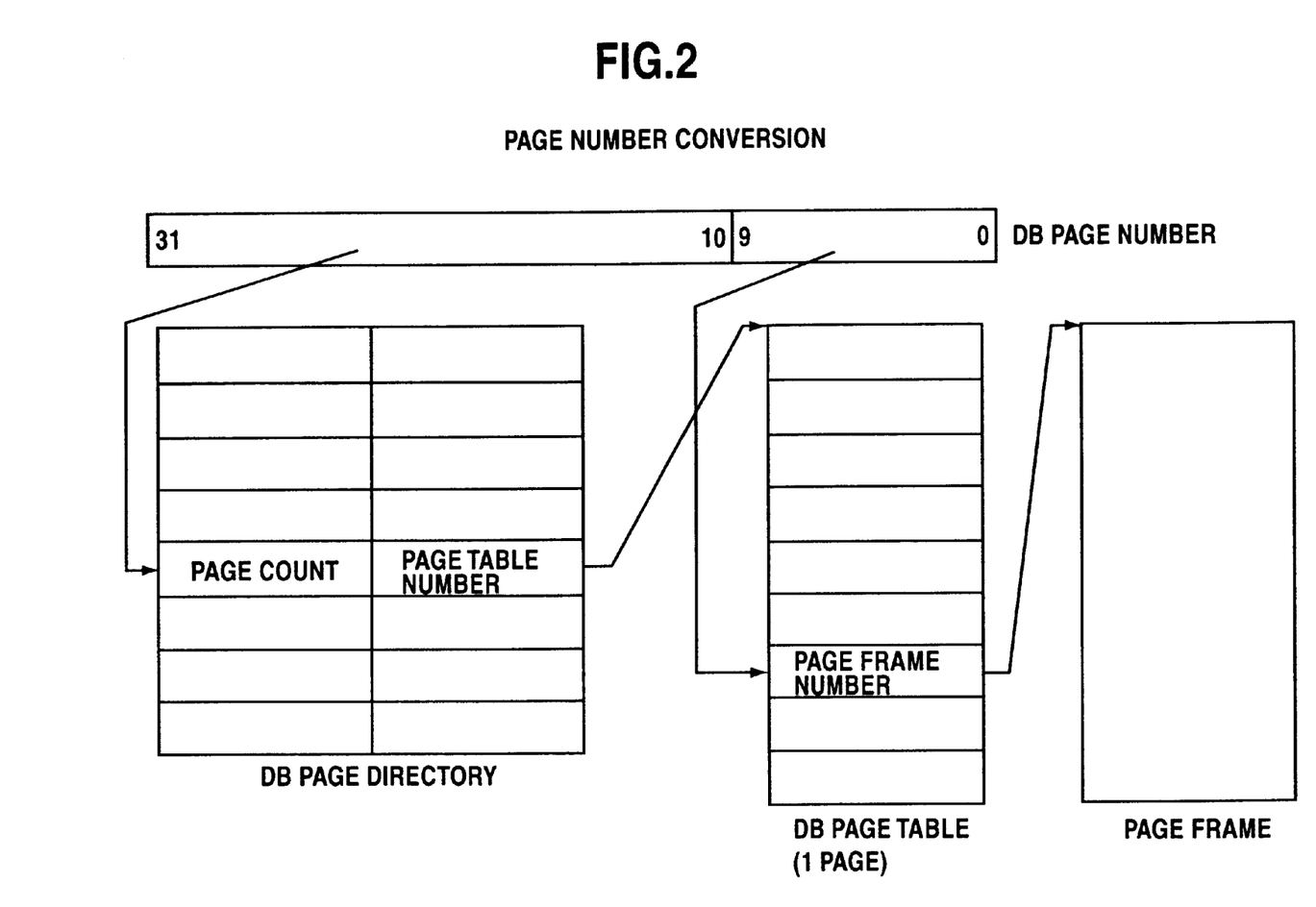
FIG. 2 is a view illustrating a page number conversion system of a preferred embodiment of the invention.

Here, as an example, the DB page numbers of the virtual DB space 5 are 32 bit and the upper 22 bits and the DB page tables are corresponded by the DB page directory.

The DB page tables are tables corresponding the DB page numbers with the page frame numbers of the virtual memory space 4. In this example, the page frame numbers are held in page units with the 1024 entries shown by the lower 10 bits of DB page numbers as one page. A "0" is stored in each entry to which a page frame of the virtual memory space 4 has not been allocated.

In the DB page directory, a "0" is stored in each entry to which a DB page table has not been allocated. In a page counter in each entry of the DB page directory is stored the number of page frames held by the single respective DB page table.

The page frames in the virtual memory space 4 are classified into a page frame group containing only correct pages that are in the virtual memory space 4, a page frame group containing only differed pages, and a page frame group containing only empty pages. For example they can be classified by constructing a series of page chains differentiated by type using page chain areas included in header parts of the DB pages themselves or in a page frame management table provided separately for managing the page frames, each page chain area including a previous page frame number and a following page frame number in a page chain.

The page chains include a correct page chain (CPC), which is a chain of page frames containing only correct pages, i.e. pages whose content is the same in the virtual DB space 5 as in the virtual DB staging drive 3, that are in the virtual memory space 4, a differed page chain (DPC), which is a chain of page frames containing only differed pages, i.e. pages whose content is different in the virtual DB space 5 from that in the virtual DB staging drive 3 and are always in the virtual memory space 4, and a free page chain (FPC), which is a chain of empty page frames allocated to the DB in the virtual memory space 4 but containing neither correct pages nor differed pages.

Figure 3:
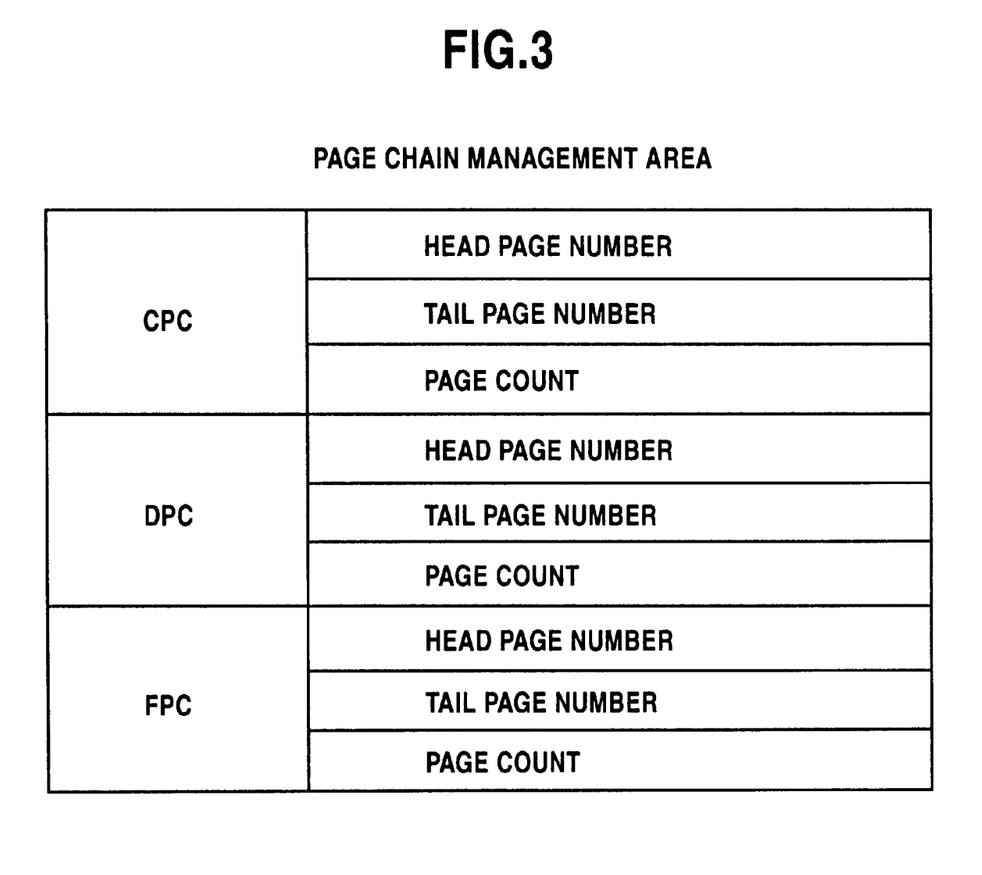
FIG. 3 is a view showing content of a CPC/DPC/FPC management area of the preferred embodiment.

A CPC/DPC/FPC management area of the kind shown in FIG. 3 is provided in a system common area and connected to the chains and holds the current number of page frames in each. Here, the head page number is the page frame number of the leading page frame of the chain, the tail page number is the page frame number of the tail page frame of the chain, and the page count is the number of page frames linked in the chain.

Figure 4:
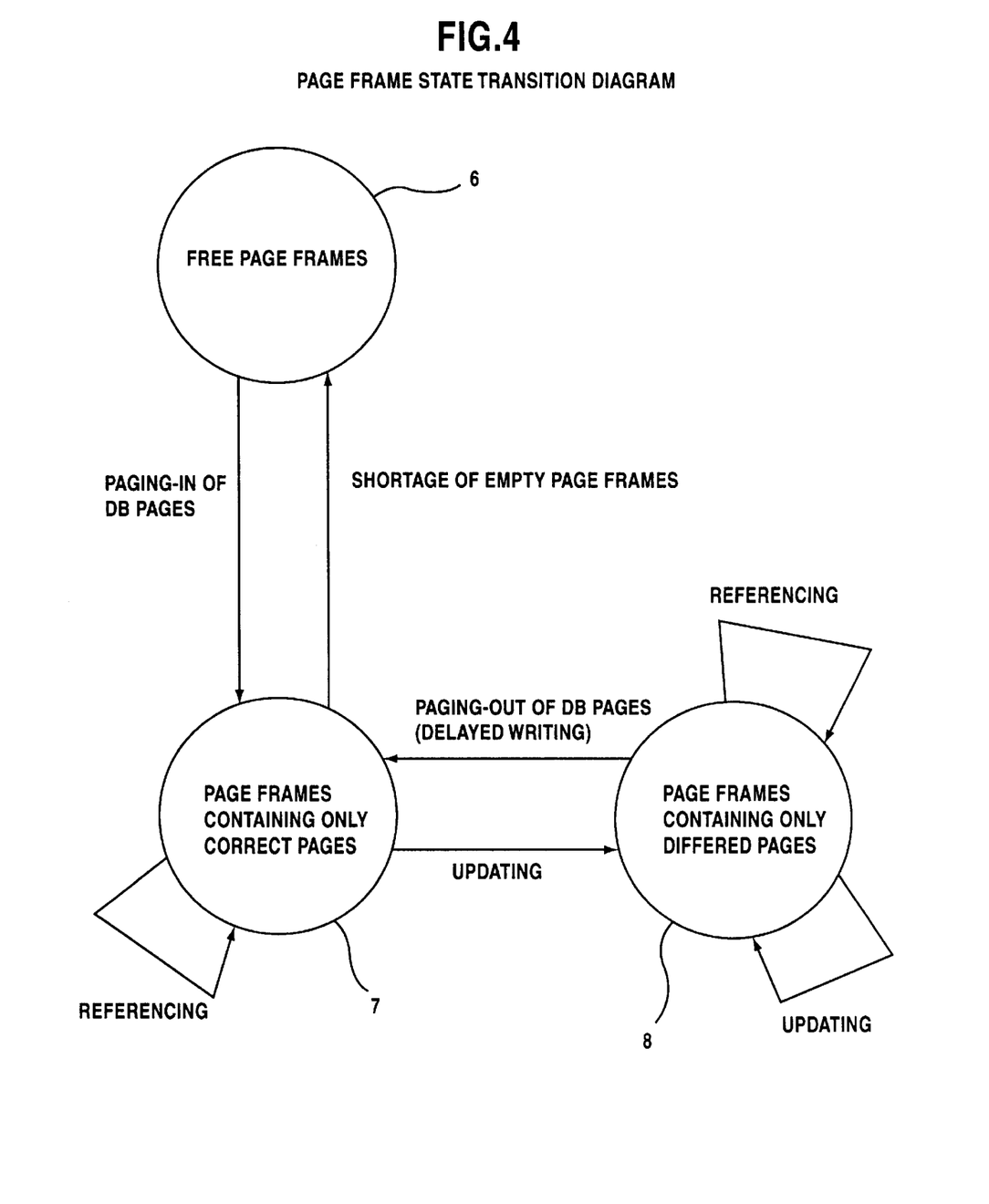
FIG. 4 is a view showing page frame state transitions of the preferred embodiment.

FIG. 4 is a diagram showing page state transitions in the page chains.

When a page not in the virtual memory space 4 is to be read, the content of the page record in the virtual DB staging drive 3 having a page record number calculated from the DB page number of the page to be read using a fixed computational expression is transferred (paged in) to the head page frame of the FPC and connected to the head of the CPC and thus that page frame becomes one of a group of page frames 7 containing only correct pages.

Although immediately after system startup there are many free page frames 6, as referencing and updating of the database is carried out the number of free page frames 6 decreases until finally there are only the page frames 7 containing only correct pages and page frames 8 containing only differed pages. Accordingly, when there is a shortage of free page frames 6, a free page frame 6 is obtained by connecting the page frame 7 containing a correct page at the tail of the CPC to the head of the FPC.

More specifically, (1) the page frame number of a page frame containing only correct pages is obtained from the tail of the CPC; (2) the DB page table entry corresponding to the page frame number obtained in (1) is set to "0"; (3) the content of the page record in the virtual DB staging drive 3 having a page record number calculated from the DB page number of the required DB page using the above-mentioned fixed computational expression is read into the page frame obtained in (1); (4) the page frame of the correct page thus read in is connected to the head of the CPC; and (5) its DB page table entry is updated.

When the content of a page is updated, the page frame containing the updated page is connected to the head of the DPC and thereby made one of the page frames 8 containing only differed pages.

The contents of page frames 8 containing only differed pages at the tail of the DPC are written into the virtual DB staging drive 3 with a lower priority than other ordinary transactions on an delayed writing basis and these page frames 8 containing only differed pages are then connected to the head of the CPC and become page frames 7 containing only correct pages. By a commonly known method, when the ratio of the number of differed pages to the number of correct pages in the virtual memory space 4 exceeds a predetermined standard value, for example when the proportion of differed pages rises above 80%, the contents of differed pages are written to the virtual DB staging drive 3 with a higher priority than other ordinary transactions and the number of the page frames 7 containing only correct pages is thereby increased. Then, when the proportion of differed pages has returned to below for example 70%, the priority with which differed pages are written to the virtual DB staging drive 3 is returned to a lower priority than that of other ordinary transactions.

When a page frame 7 containing only correct pages is referenced, that page frame is connected to the head of the CPC. When a page frame 8 containing only differed pages is referenced or updated, that page frame is connected to the head of the DPC.

As mentioned above, differed pages are written back to the virtual DB staging drive 3 in order from the least recently differed page. Because the page frames of these pages remain in the virtual DB space 5 as page frames 7 containing only correct pages, when these correct pages are used again they do not have to be paged in from the virtual DB staging drive 3 and thus the throughput of the system can be increased.

In the above, the head of the page chain does not mean only the single page frame at the extreme head of the chain, and it is possible using a predetermined method for a most suitable frame to be selected from among the page frames near the head of the chain. Similarly, the tail does not mean only the single page frame at the extreme tail of the chain and it is possible using a predetermined method for a most suitable frame to be selected from among the page frames near the tail of the chain.

A method for making the virtual database space of a virtual database space system according to the invention nonvolatile as seen by a user will now be described.

Figure 5:
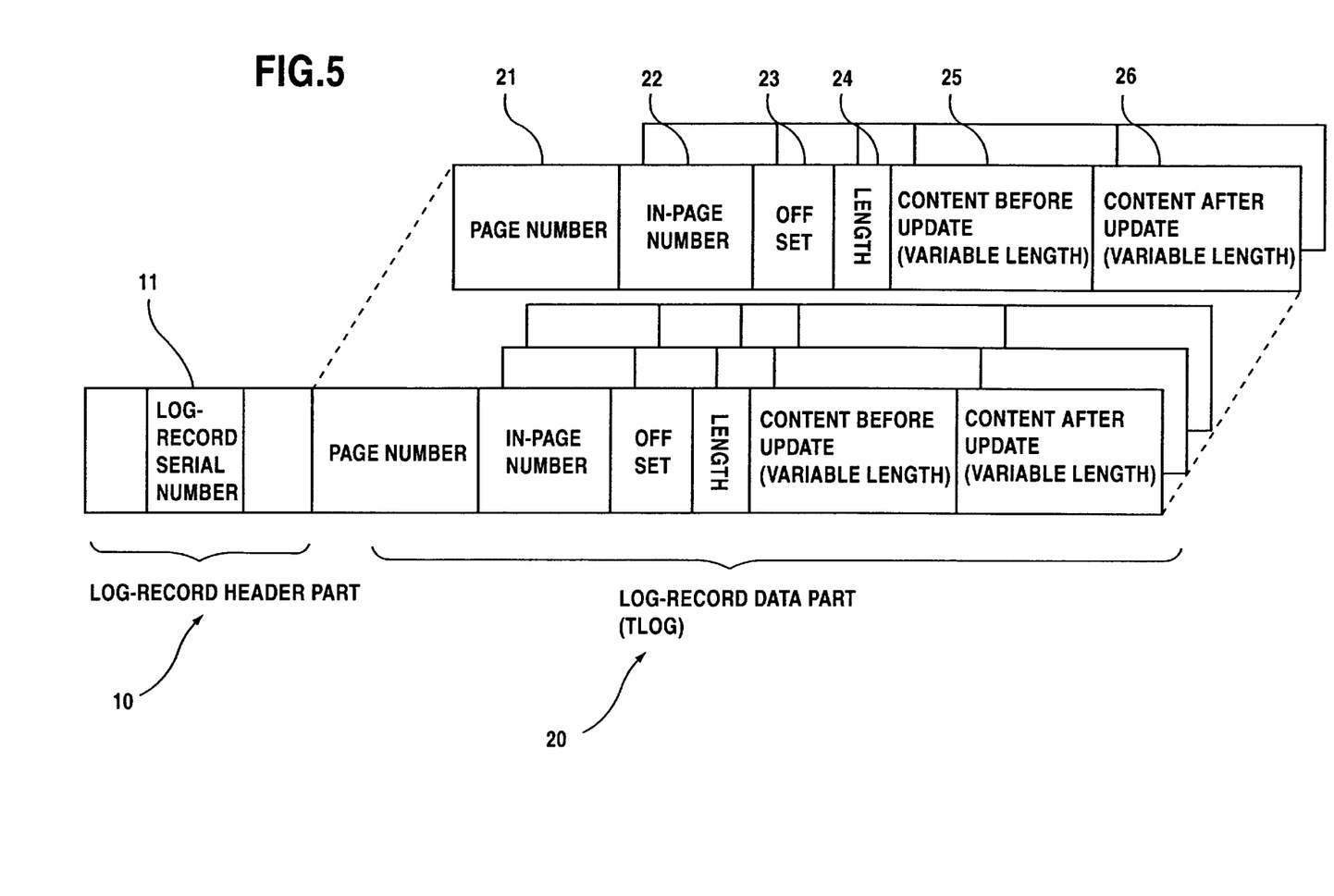
FIG. 5 is a view showing a data structure in a TLOG stack of the preferred embodiment.

In a nonvolatile database space system according to the invention, when a page is updated, as history, a log-record header part 10 including a log-record serial number 11 and a log-record data part 20 (hereinafter referred to as a TLOG) including a page number 21 of an updated page, an in-page number 22 showing EL position in an order of updates of data elements within the same page, an offset 23 showing the updated portion in the page, and a data length 24 and the content 25, 26 before and after the update in transaction units of the page are recorded, as shown in FIG. 5. A TLOG serial number record part in which the serial number of the log-record is recorded is provided in the system common area. The TLOG serial number is for example made up of a date and a process serial number of that day. For example at the end of each page, a DW serial number (Delayed Write serial number) which is the TLOG serial number of immediately before the differed page becomes a correct page as a result of delayed writing is included. Here, the reason for an example wherein the DW serial number is disposed at the end of the page being shown is that when this is done, when a fault has occurred during delayed writing of the page, recovery of the page is possible by a relatively simple method using the DW serial number and a TW serial number and content before and after the update recorded in the log-record. However, the position of the DW serial number in the page in the invention is not limited to the end of the page.

Figure 6:
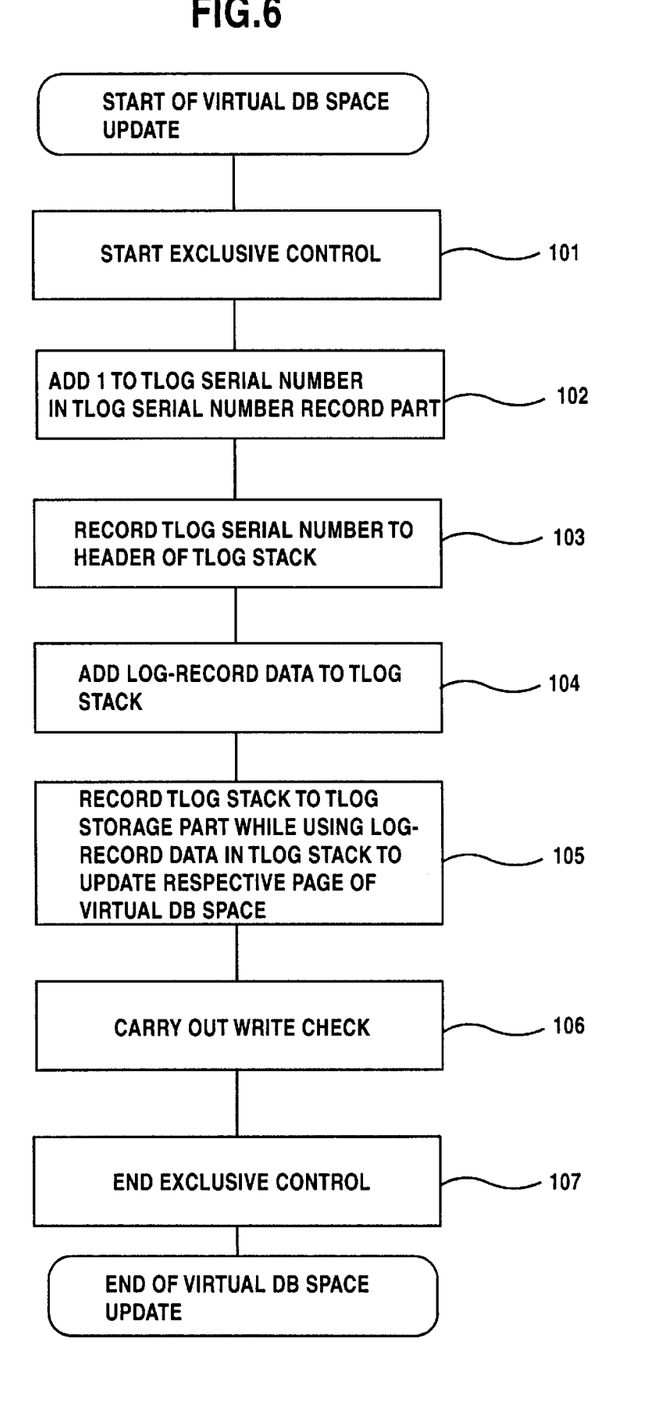
FIG. 6 is a flow chart showing a procedure for updating a page in a nonvolatile virtual database space system of the preferred embodiment.

FIG. 6 is a flow chart showing a procedure for updating the content of a page.

The series of processes for updating the content of a page are carried out under exclusive control so that they do not simultaneously overlap with similar processing of other transactions.

After exclusive control is started in a step 101, in step 102 a TLOG serial number recorded in the TLOG serial number record part is increased. In this preferred embodiment 1 is added to it, but provided that the TLOG serial number increases monotonously any value may be added to it. It is also possible to always increase the TLOG serial number by a negative number, i.e. to reduce it monotonously. When the TLOG serial number is monotonously reduced like this, the comparison of serial number sizes in the following process is reversed.

In step 103 this increased TLOG serial number is recorded to the log-record serial number in the header part of a TLOG stack as a TW serial number (TLOG Write serial number).

Next, in step 104 a TLOG, which is the log-record data part, is added to the TLOG stack. As the TLOG stack, for example a buffer in the virtual memory space 4 of the OS is used.

In step 105 a page in the virtual DB space 5 is updated using the content of the TLOG in the TLOG stack. At the same time, the content of the TLOG stack is recorded in a TLOG storage part. In step 106, by means of generally known computer hardware or a function of the OS, or by reading the TLOG storage part again, a write check is carried out. During this time, transaction processing outside this exclusive control interval can be executed concurrently. A nonvolatile storage device is used for the TLOG storage part, but the record is preferably made in duplicate in case a failure occurs in the log.

After that, exclusive control ends in step 107 and updating of the virtual DB space finishes.

In a nonvolatile virtual database space system according to the invention, a check point is periodically provided, and at this check point the content of all the differed pages in the differed page chain is written to the virtual DB staging drive 3. More specifically, the check point is started at intervals of a fixed cycle, for example at intervals of a fixed time or of a fixed number of updates. When the check point is started, writing of the content of the differed pages to the virtual DB staging drive is given priority and soon all the differed pages are connected to the correct page chain and become correct pages, whereupon the contents of all the pages of the virtual DB space 5 and all the pages of the virtual DB staging drive 3 match. At this time, a check point log-record containing a flag indicating that a check point has been taken and the TW serial number, which is the TLOG serial number of that time, is written into the TLOG storage part.

When a virtual database space system according to the invention is shut down normally, a check point is finally taken before the user is informed of the shut down. Therefore, the system shuts down with the contents of all differed pages writ-en to the virtual DB staging drive 3.

Figure 7:
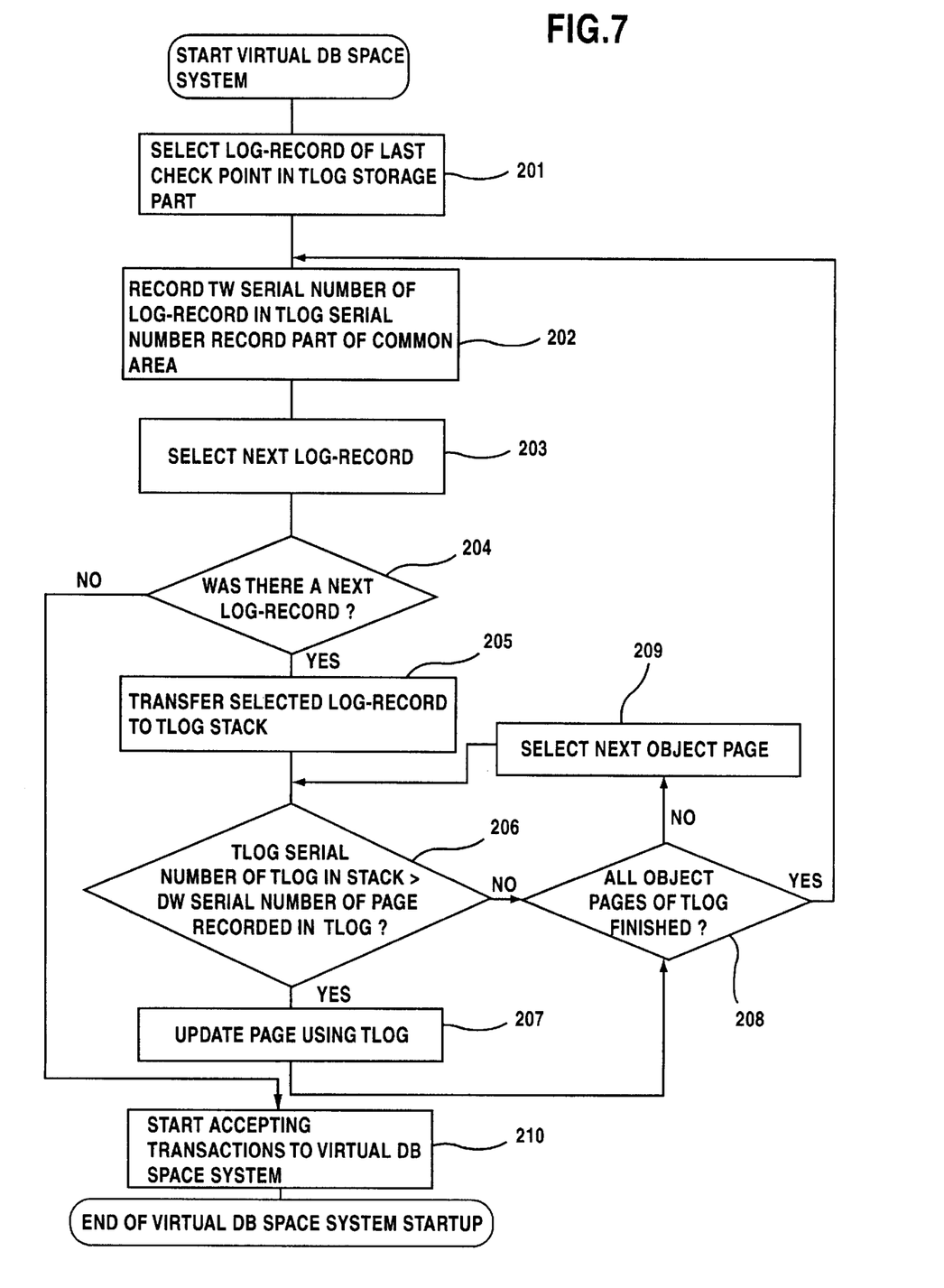
FIG. 7 is a flow chart showing a process for starting the nonvolatile virtual database space system of the preferred embodiment.

FIG. 7 is a flow chart showing a process for starting up a nonvolatile virtual database space system according to the invention. First, in a step 201, the last check point log-record in the TLOG storage part is selected. In step 202, the TW serial number of the log-record is recorded in the TLOG serial number record part in the common area. In step 203 the next log-record is selected. When in step 204 it is determined that a next log-record exists, in step 205 the log-record selected in step 203 is transferred to the TLOG stack. In step 206, the TW serial number in the TLOG stack and the DW serial number in the DB page in the virtual DB space shown by the page number recorded in the TLOG are compared and if the TW serial number is larger than the DW serial number the content of that DB page is updated using the content of the log-record in the TLOG stack in step 207. However, in the processing at the time of startup, because the content of the TLOG stack is already recorded in the TLOG storage part, the process of recording it in the TLOG storage part is bypassed.

After step 207, or when in step 206 the TW serial number in the stack is equal to or less than the DW serial number in the page shown by the page number recorded in the TLOG, in step 208 it is determined whether all the object pages of the TLOG have been finished and if there is a next object page then in step 209 that object page is selected and if they are all finished processing returns to step 202.

When in step 204 it is determined that there is no next log-record, i.e. when all log-records in the TLOG storage part subsequent to the last check point have been checked, in step 210 acceptance of inputting of transactions to the database is started and startup of the virtual DB space system ends. Also, even if the during startup of the virtual database space system the startup is interrupted, intentionally or for some other reason, by restarting the system again, with this invention, processing of unrecovered log-record data parts can be continued without carrying out repeat processing of recovered log-record data parts. This is the same even if there are repeated interruptions.

In a startup following a normal shut down the last check point is the last log-record, and there is no log data to be recovered. That is, because the state is the same as the state after a recovery process has been completed, a state wherein transactions to the database can be accepted is reached just by the log-record serial number in the check point log being set in the TLOG serial number record part of the common area as usual. In a startup following an abnormal shut down, because usually a log-record exists after the last check point, pages not written to the virtual DB space 5 are automatically distinguished and reflected into the virtual DB space 5 by the system described above. In this case, pages not in the DPC or the CPC are inputted from the virtual DB staging drive 3 as normal processing. The log-record serial number in the last log-record is left in the TLOG serial number record part of the common area and a state wherein transactions to the database can be accepted is reached. It is sufficient for a user to simply start the system, irrespective of whether or not the startup follows a failure. In this case, whether or not updates have been reflected to the virtual DB staging drive 3 is not a problem as they will soon be delay-written along with results of the newly started transaction processing.

Thus, according to this invention, when there is no time to shut down the system normally it is sufficient to simply stop the system and on subsequent startup to start the system in the usual way. Since the necessary recovery of the space at this time is all carried out by the system of the invention itself, as long as there is no problem with the program of the system or with its environment and particularly the virtual DB staging drive 3, as seen by a user a permanent, not temporary, database resides in the nonvolatile virtual DB space 5.

In the preferred embodiment described above, log-record data of a single transaction is recorded in the TLOG stack; however, it is also possible to stack log-record data of multiple transactions onto the TLOG stack and update pages in the virtual DB space 5 and write out to the TLOG storage part and then perform the above-mentioned write check in batches of content of the TLOG stack at fixed intervals (for example 100 milliseconds), and the processing efficiency of the system can thereby be increased.

While the entire content of the database in the virtual DB staging drive 3 is being backed up to the backup drive 9, the writing on a delayed writing basis of content of the page frames 8 containing only differed pages at the tail of the DPC into the virtual DB staging drive 3 is completely stopped. As a result, the database in the virtual DB staging drive 3 is not updated during this time and it is possible for backing up to be carried out correctly.

Although the delayed writing is stopped, the virtual DB space 5 can receive updates of the database. During backup the proportion of differed pages increases continually, and when it becomes 100% updating of the database becomes impossible; therefore, to prevent this, backup is preferably started immediately after a check point, when the proportion of differed pages is 0%, and at a time when the updating load on the database is small.

When a failure occurs in the virtual DB staging drive 3, first, the content of the backup drive 9 is written back to the virtual DB staging drive 3. Or, the virtual DB staging drive 3 is disconnected and the backup drive 9 is used as the virtual DB staging drive.

Figure 8:
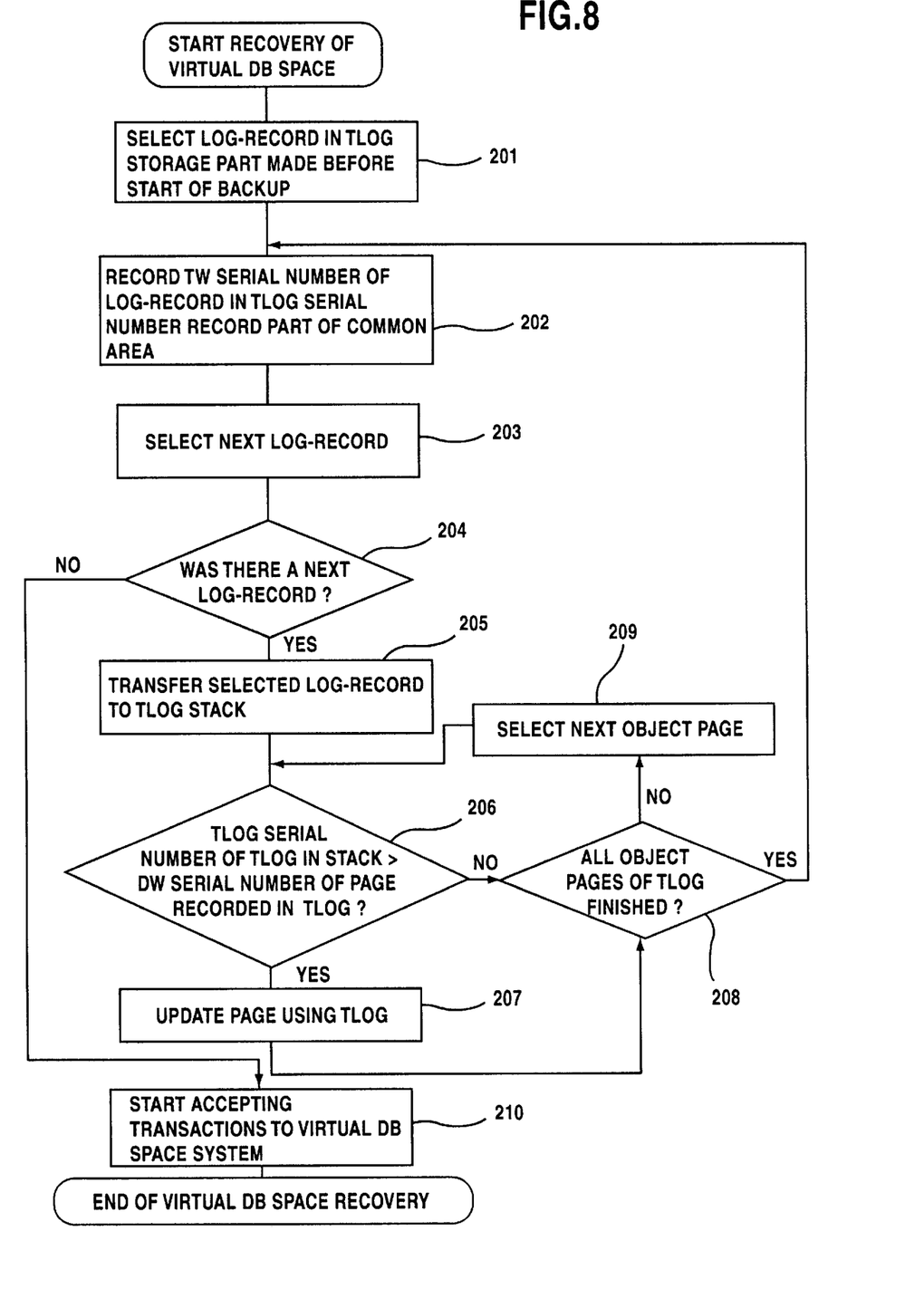
FIG. 8 is a flow chart showing a process for recovering the nonvolatile virtual database space system of the preferred embodiment.

Then, as shown in FIG. 8, the virtual DB space 5 is recovered using log-records subsequent to a log-record made before the time at which taking of the backup was started. At this time, except that the log-record selected in step 201' is not the log-record of the last check point in the TLOG storage part but rather a log-record recorded before the start of backing up, exactly the same procedure of steps 202 through 210 as that for starting the system normally can be used. The content of the recovered virtual DB space 5 is soon reflected into the virtual DB staging drive 3 by delayed writing.

According to another preferred embodiment of the invention, it is possible to copy the database to the backup drive 9 without stopping delayed writing during the backup, i.e. while rewriting the content of the virtual DB staging drive 3. In this case, matching of the database in the backup drive 9 with that in the virtual DB staging drive 3 may not be obtained, but if after the content of the backup drive 9 is written back to the virtual DB staging drive 3 or the backup drive 9 is used as the virtual DB staging drive recovery is carried out by the kind of procedure shown in FIG. 8, unnecessary log-records are skipped and pages needing to be updated are updated and the database is recovered correctly.

In the preferred embodiments described above the invention was applied to a computer having a virtual memory mechanism, but by using the memory 1 in place of the virtual memory space 4 the invention can also be used in a computer not having a virtual memory mechanism.

The nonvolatile virtual database space system providing a logically nonvolatile and very large space of the invention can be realized by means of a computer and a program for executing the kinds of procedure described above. The computer program is normally provided on a CD-ROM, a floppy disc, magnetic tape or another magnetic recording medium, and is installed onto a hard disc or the like constituting secondary storage device of the computer and then read into memory constituting main storage device of the computer system before being used.

What is claimed is:

1. A virtual database space system which is a database system using a computer system which has a main storage device and a secondary storage device and a virtual memory mechanism and transfers pages constituting data structures of fixed length between the secondary storage device and the main storage device while carrying out processing and when a page to be processed is not present in the main storage device reads that page from the secondary storage device to an empty page frame in the main storage device or to a page frame made free by a used page in the main storage device being written out to the secondary storage device, the virtual database space system comprising:

a staging drive which is a nonvolatile auxiliary memory device larger than a virtual memory space formed by the virtual memory mechanism and can also be utilized as temporary database saving means at the time of a stoppage of the database system;

means for when the database system is operating transferring pages of a database between the staging drive and the virtual memory space while carrying out processing and when a page to be processed is not present in the virtual memory space reading that page from the staging drive to a page frame of the virtual memory space; and means for corresponding a logical page number of a page in a virtual database space having a capacity larger than the virtual memory space to a page frame number of the virtual memory space.

2. A virtual database space system according to claim 1, further comprising:

means for classifying page frames in the virtual memory space into a page frame group that is a set of page frames containing only correct pages, whose content is the same in the virtual database space as in the staging drive, that are in the virtual memory space, a page frame group that is a set of page frames containing only differed pages, whose content is different in the virtual database space from in the staging drive and which are always in the virtual memory space, and a page frame group that is a set of page frames containing only empty pages;

means for assigning to the page frames in the page frame group containing only correct pages, the page frame group containing only differed pages and the page frame group containing only empty pages an order within the respective page frame group;

means for when a page in the virtual database space not present in the virtual memory space is required transferring the content of a page record in the staging drive corresponding to a logical page number of the page in the virtual database space into a page frame at or near the head of the page frame group containing only empty pages and making this page frame a page frame at or near the head of the page frame group containing only correct pages;

means for when there is a shortage of empty pages making a page frame at or near the tail of the page frame group containing only correct pages a page frame at or near the head of the page frame group containing only empty pages;

means for when updating the content of a correct page or a differed page in the virtual memory space making the page frame containing the updated page a page frame at or near the head of the page frame group containing only differed pages; and means for delay-writing the content of a page frame at or near the tail of the page frame group containing only differed pages into the staging drive with a priority lower than that of other ordinary transaction processing and making that page frame containing a differed page a page frame at or near the head of the page frame group containing only correct pages.

3. A virtual database space system according to claim 2, further comprising means for when the ratio of the number of page frames containing differed pages to the number of page frames containing correct pages in the virtual memory space exceeds a predetermined standard value delay-writing content of the page frame group containing only differed pages to the staging drive with a priority higher than that of other ordinary transaction processing and increasing the number of page frames containing correct pages.

4. A virtual database space system according to claim 2, further comprising:

means for recording in a log-record serial number record part a serial number of a log-record of a log constituting a history of all updates of pages in the virtual database space;

means for obtaining a log-record serial number from the log-record serial number record part immediately before a differed page is delay-written from the page frame group containing only differed pages to the staging drive and setting the log-record serial number in that differed page and written as a DW serial number of when the differed page became a correct page along with the delayed writing;

means for when the content of a page is to be updated increasing the log-record serial number in the log-record serial number record part and writing into a log-record stack a log-record including that log-record serial number as a TW serial number and including for each of transaction groups each made up of at least one transaction a page number of one or more pages to be updated in units of these transaction groups and a data length and content before and after updating for every data element to be an object of updating within each page or these repeated; and means for updating pages in the virtual memory space using content of log-records in the log-record stack transferring pages from the staging drive when necessary and recording content of log-records in the log-record stack in a log storage part of a nonvolatile storage device.

5. A virtual database space system according to claim 4, comprising:

means for providing a check point at predetermined intervals and when the check point is reached writing the contents of all of the differed pages in the page frame group containing only differed pages to the staging drive and adding the page frames of all of the differed pages to the page frame group containing only correct pages to make page frames containing correct pages; and means for when the system starts up sequentially transferring to the log-record stack in order all log-records subsequent to the last check point and when a TW serial number of a log-record in the log-record stack is larger than the DW serial number of a page shown by a page number in the log-record updating the page in the virtual memory space using the content of the log-record in the log-record stack transferring a page from the staging drive when necessary.

6. A virtual database space system according to claim 1, wherein a main storage device is used in place of the virtual memory space.

7. A virtual database space system according to claim 2, further comprising:

a backup drive which is a nonvolatile auxiliary memory device for recording a copy of the content of the staging drive; and means for while the content of the staging drive is being copied to the backup drive completely stopping the delayed writing to the staging drive of content of page frames at or near the tail of the page frame group containing only differed pages.

8. A virtual database space system according to claim 7, further comprising means for writing the content of the backup drive back to the staging drive when a failure has occurred in the staging drive and means for transferring to the log-record stack in order a log-record recorded before the time at which copying to the backup drive was started and all log-records subsequent to that log-record and when a TW serial number of a log-record in the log-record stack is larger than the DW serial number of a page shown by a page number in the log-record updating the page in the virtual memory space using the content of the log-record in the log-record stack transferring a page from the staging drive when necessary.

9. A computer-readable recording medium recorded with a database program for realizing a virtual database space system according to claim 1, comprising:

a procedure for when the database system is operating transferring pages of a database between the staging drive and the virtual memory space while carrying out processing and when a page to be processed is not present in the virtual memory space reading that page from the staging drive to a page frame of the virtual memory space; and a procedure for corresponding a logical page number of a page in a virtual database space having a capacity larger than the virtual memory space to a page frame number of the virtual memory space.

10. A computer-readable recording medium according to claim 9 recorded with a database program comprising:

a procedure for classifying page frames in the virtual memory space into a page frame group that is a set of page frames containing only correct pages, whose content is the same in the virtual database space as in the staging drive, that are in the virtual memory space, a page frame group that is a set of page frames containing only differed pages, whose content is different in the virtual database space from in the staging drive and which are always in the virtual memory space, and a page frame group that is a set of page frames containing only empty pages;

a procedure for assigning to the page frames in the page frame group containing only correct pages, the page frame group containing only differed pages and the page frame group containing only empty pages an order within the respective page frame group;

a procedure for when a page in the virtual database space not present in the virtual memory space is required transferring the content of a page record in the staging drive corresponding to a logical page number of the page in the virtual database space into a page frame at or near the head of the page frame group containing only empty pages and making this page frame a page frame at or near the head of the page frame group containing only correct pages;

a procedure for when there is a shortage of empty pages making a page frame at or near the tail of the page frame group containing only correct pages a page frame at or near the head of the page frame group containing only empty pages;

a procedure for when updating the content of a correct page or a differed page in the virtual memory space making the page frame containing the updated page a page frame at or near the head of the page frame group containing only differed pages; and a procedure for delay-writing the content of a page frame at or near the tail of the page frame group containing only differed pages into the staging drive with a priority lower than that of other ordinary transaction processing and making that page frame containing a differed page a page frame at or near the head of the page frame group containing only correct pages.

11. A computer-readable recording medium according to claim 10 recorded with a database program comprising a procedure for when the ratio of the number of page frames containing differed pages to the number of page frames containing correct pages in the virtual memory space exceeds a predetermined standard value delay-writing content of the page frame group containing only differed pages to the staging drive with a priority higher than that of other ordinary transaction processing and increasing the number of page frames containing correct pages.

12. A computer-readable recording medium according to claim 10 recorded with a database program for realizing a virtual database space system which is a database system using a computer system which has a main storage device and a secondary storage device and a virtual memory mechanism and transfers pages constituting data structures of fixed length between the secondary storage device and the main storage device while carrying out processing and when a page to be processed is not present in the main storage device reads that page from the secondary storage device to an empty page frame in the main storage device or to a page frame made free by a used page in the main storage device being written out to the secondary storage device, said virtual database space system comprising:

a staging drive which is a nonvolatile auxiliary memory device larger than a virtual memory space formed by the virtual memory mechanism and can also be utilized as temporary database saving means at the time of a stoppage of the database system;

means for when the database system is operating transferring pages of a database between the staging drive and the virtual memory space while carrying out processing and when a page to be processed is not present in the virtual memory space reading that page from the staging drive to a page frame of the virtual memory space; and means for corresponding a logical page number of a page in a virtual database space having a capacity larger than the virtual memory space to a page frame number of the virtual memory space, said virtual database system further comprising means for classifying page frames in the virtual memory space into a page frame group that is a set of page frames containing only correct pages, whose content is the same in the virtual database space as in the staging drive, that are in the virtual memory space, a page frame group that is a set of page frames containing only differed pages, whose content is different in the virtual database space from in the staging drive and which are always in the virtual memory space, and a page frame group that is a set of page frames containing only empty pages;

means for assigning to the page frames in the page frame group containing only correct pages, the page frame group containing only differed pages and the page frame group containing only empty pages an order within the respective page frame group;

means for when a page in the virtual database space not present in the virtual memory space is required transferring the content of a page record in the staging drive corresponding to a logical page number of the page in the virtual database space into a page frame at or near the head of the page frame group containing only empty pages and making this page frame a page frame at or near the head of the page frame group containing only correct pages;

means for when there is a shortage of empty pages making a page frame at or near the tail of the page frame group containing only correct pages a page frame at or near the head of the page frame group containing only empty pages;

means for when updating the content of a correct page or a differed page in the virtual memory space making the page frame containing the updated page a page frame at or near the head of the page frame group containing only differed pages;

means for delay-writing the content of a page frame at or near the tail of the page frame group containing only differed pages into the staging drive with a priority lower than that of other ordinary transaction processing and making that page frame containing a differed page a page frame at or near the head of the page frame group containing only correct pages;

means for recording in a log-record serial number record part a serial number of a log-record of a log constituting a history of all updates of pages in the virtual database space;

means for obtaining a log-record serial number from the log-record serial number record part immediately before a differed page is delay-written from the page frame group containing only differed pages to the staging drive and setting the log-record serial number in that differed page and written as a DW serial number of when the differed page became a correct page along with the delayed writing;

means for when the content of a page is to be updated increasing the log-record serial number in the log-record serial number record part and writing in to a log-record stack a log-record including that log-record serial number as a TW serial number and including for each of transaction groups each made up of at least one transaction a page number of one or more pages to be updated in units of these transaction groups and a data length and content before and after updating for every data element to be an object of updating within each page or these repeated; and means for updating pages in the virtual memory space using content of log-records in the log-record stack transferring pages from the staging drive when necessary and recording content of log-records in the log-record stack in a log storage part of a nonvolatile storage device, said computer-readable medium comprising a procedure for recording in a log-record serial number record part a serial number of a log-record of a log constituting a history of all updates of pages in the virtual database space;

a procedure for obtaining a log-record serial number from the log-record serial number record part immediately before a differed page is delay-written from the page frame group containing only differed pages to the staging drive and setting the log-record serial number in that differed page and written as a DW serial number of when the differed page became a correct page along with the delayed writing;

a procedure for when the content of a page is to be updated increasing the log-record serial number in the log-record serial number record part and writing into a log-record stack a log-record including that log-record serial number as a TW serial number and including for each of transaction groups each made up of at least one transaction a page number of one or more pages to be updated in units of these transaction groups and a data length and content before and after updating for every data element to be an object of updating within each page or these repeated; and a procedure for updating pages in the virtual memory space using content of log-records in the log-record stack transferring pages from the staging drive when necessary and recording content of log-records in the log-record stack in a log storage part of a nonvolatile storage device.

13. A computer-readable recording medium according to claim 12 recorded with a database program comprising:

a procedure for providing a check point at predetermined intervals and when the check point is reached writing the contents of all of the differed pages in the page frame group containing only differed pages to the staging drive and adding the page frames of all of the differed pages to the page frame group containing only correct pages to make page frames containing correct pages; and a procedure for when the system starts up sequentially transferring to the log-record stack in order all log-records subsequent to the last check point and when a TW serial number of a log-record in the log-record stack is larger than the DW serial number of a page shown by a page number in the log-record updating the page in the virtual memory space using the content of the log-record in the log-record stack transferring a page from the staging drive when necessary.

14. A computer-readable recording medium according to claim 10, recorded with a database program comprising a procedure for using a main storage device in place of the virtual memory space.

15. A computer-readable recording medium according to claim 10, recorded with a database program comprising:

a procedure for copying the content of the staging drive to a backup drive which is a nonvolatile auxiliary memory device; and a procedure for while the content of the staging drive is being copied to the backup drive completely stopping the delayed writing to the staging drive of content of page frames at or near the tail of the page frame group containing only differed pages.

16. A computer-readable recording medium according to claim 15, recorded with a database program comprising a procedure for writing the content of the backup drive back to the staging drive when a failure has occurred in the staging drive and a procedure for transferring to the log-record stack in order a log-record recorded before the time at which copying to the backup drive was started and all log-records subsequent to that log-record and when a TW serial number of a log-record in the log-record stack is larger than the DW serial number of a page shown by a page number in the log-record updating the page in the virtual memory space using the content of the log-record in the log-record stack transferring a page from the staging drive when necessary.

* * * * *